(12) United States Patent
Medicke et al.

(10) Patent No.: US 7,530,012 B2
(45) Date of Patent: May 5, 2009

(54) INCORPORATION OF SPREADSHEET FORMULAS OF MULTI-DIMENSIONAL CUBE DATA INTO A MULTI-DIMENSIONAL CUBE

(75) Inventors: John A. Medicke, Raleigh, NC (US); Feng-Wei Chen Russell, Cary, NC (US); Stephen H. Rutledge, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 484 days.

(21) Appl. No.: 10/443,523

(22) Filed: May 22, 2003

(65) Prior Publication Data

US 2004/0237029 A1 Nov. 25, 2004

(51) Int. Cl.
*G06F 17/00* (2006.01)

(52) U.S. Cl. .................. 715/212; 715/213; 715/219; 707/1; 707/104.1

(58) Field of Classification Search .......... 715/503, 715/212–220; 707/1, 2, 3, 104.1, 102, 103, 707/9, 4; 712/1
See application file for complete search history.

(56) References Cited

U.S. PATENT DOCUMENTS

| | | | |
|---|---|---|---|
| 5,317,686 A | 5/1994 | Salas et al. | 395/157 |
| 5,604,854 A | 2/1997 | Glassey | 395/764 |
| 5,918,232 A * | 6/1999 | Pouschine et al. | 707/103 R |
| 6,317,750 B1 | 11/2001 | Tortoloni et al. | 707/103 |
| 6,385,604 B1 | 5/2002 | Bakalash et al. | 707/3 |
| 6,408,292 B1 * | 6/2002 | Bakalash et al. | 707/2 |
| 6,456,997 B1 | 9/2002 | Shukla | 707/1 |
| 6,581,068 B1 * | 6/2003 | Bensoussan et al. | 707/104.1 |
| 6,651,055 B1 * | 11/2003 | Kilmer et al. | 707/3 |
| 6,684,206 B2 * | 1/2004 | Chen et al. | 707/3 |
| 7,003,504 B1 * | 2/2006 | Angus et al. | 707/1 |
| 7,039,871 B2 * | 5/2006 | Cronk | 715/741 |
| 2001/0007988 A1 | 7/2001 | Bauchot et al. | 707/100 |
| 2001/0054034 A1 * | 12/2001 | Arning et al. | 707/1 |
| 2002/0013786 A1 | 1/2002 | Machalek | 707/503 |
| 2002/0059203 A1 * | 5/2002 | Witkowski et al. | 707/3 |
| 2002/0087633 A1 | 7/2002 | Nelson | 709/204 |
| 2002/0087686 A1 | 7/2002 | Cronk | 709/225 |
| 2002/0184260 A1 * | 12/2002 | Martin et al. | 707/503 |
| 2003/0009649 A1 * | 1/2003 | Martin et al. | 712/1 |
| 2003/0023608 A1 * | 1/2003 | Egilsson et al. | 707/100 |
| 2005/0015360 A1 * | 1/2005 | Cras et al. | 707/2 |

FOREIGN PATENT DOCUMENTS

| | | |
|---|---|---|
| CA | 2343671 A1 | 11/2001 |
| EP | 1077420 A2 | 2/2001 |

OTHER PUBLICATIONS

Chaudhuri et al "AN Onverview od data warehousing and OLAP Technology" 1997 whole document.*

(Continued)

*Primary Examiner*—Doug Hutton
*Assistant Examiner*—Quoc A Tran
(74) *Attorney, Agent, or Firm*—Stevens & Showalter LLP

(57) ABSTRACT

Computations included in analytics of a multi-dimensional cube are generated by analyzing a spreadsheet corresponding to data downloaded from the multi-dimensional cube so as to automatically convert a formula utilizing the downloaded data contained in the spreadsheet into a language of the multi-dimensional cube so as to provide a converted formula. The converted formula is incorporated into the multi-dimensional cube as a computed member.

10 Claims, 10 Drawing Sheets

OTHER PUBLICATIONS

User-cognizant multidimensional analysis-Sunita Sarawagi-Indian Institute of Technology, Bombay, India Edited by A. El Abbadi, G. Schlageter, K.-Y. Whang. Published online: Jun. 7, 2001- pp. 224-239.*

Kaciak et al. "A spreadsheet approach to principal components analysis," *Journal of Microcomputer Applications*. (1989) vol. 12, pp. 281-291.

Miller et al. "The Use of a Three Dimensional Spreadsheet to Prepare Audit Wokpapers," *Simulation in Business and Management*. Proc. of the SCS Multiconference on Simulation in Business and Management, Jan. 17-19, 1990, vol. 22, No. 1.

Wong et al. "Modelling and Manipulating Multidimensional Data in Semistructured Databases," *World Wide Web*, 2001, vol. 4, pp. 79-99.

Scheffy, Hugh. "'Cube' the Power of your Spreadsheet with OLAP," *Management Accounting*. Feb. 1998, pp. 50-54.

"Linking and Consolidating Spreadsheets"; M. Bryan; Business Software, vol. 5, np 3, pp. 42-50, Mar. 1997.

Lin et al. "A Database Application Generator for the WWW," Journal of the Chinese Institute of Engineers. 1998, vol. 21, No. 3, pp. 337-346.

Taylor, Art, "Java-Charging the Data Warehouse," *Database Programming & Design*. 1997, vol. 10, No. 10, p. 58.

Malloy et al., U.S. Appl. No. 09/565,132, filed May 4, 2000.

* cited by examiner

Figure 4

INCORPORATION OF SPREADSHEET FORMULAS OF MULTI-DIMENSIONAL CUBE DATA INTO A MULTI-DIMENSIONAL CUBE

FIELD OF THE INVENTION

The present invention relates to multi-dimensional cubes and more particularly to the analysis and maintenance of multi-dimensional cubes.

BACKGROUND OF THE INVENTION

With increases in the use of computers to collect and store data and with increases in computer based transactions, such as over the Internet, there has been a proliferation of databases containing large amounts of historical data commonly referred to as "data warehouses." For example, as more and more data is collected regarding consumer purchase and/or shopping habits, this data may be stored in a data warehouse for subsequent analysis. Other uses of data warehouses include, for example, data warehouses of genetic or other scientific data.

While the particular data may vary for different data warehouses, in general, data warehouses are databases of historical data that may utilize a "star-schema" database structure. A data warehouse is typically present to users through a multi-dimensional hypercube (a "multi-dimensional cube") and provides an ad hoc query environment. Furthermore, the data warehouse will, typically, contain a large amount of data and have a complex structure.

The multi-dimensional hypercube, typically includes several "dimensions" where each dimension includes "members." The members of a dimension may have a hierarchical structure. A "measure" of a dimension or dimensions may be incorporated into a data warehouse as a pre-calculated value. Thus, a measure is a computed member. For example, a measure may be incorporated into a meta-outline of a data warehouse. In such a way, the pre-calculated "measure" may be made available to users of the data warehouse. Pre-calculated measures of dimensions of a data warehouse are sometimes referred to as "analytics" of a data warehouse.

Because of the size and complexity of data warehouses, they are typically created, administered and maintained by an information technology specialist. As such, creation, modification and/or analysis of data warehouses may be a costly and time consuming proposition.

For example, in creating a data warehouse, an enterprise data architecture is typically analyzed and represented in the data warehouse. After this analysis, the data is extracted, transformed and loaded into the data warehouse from other, dissimilar databases. This analysis and creation of the data warehouse architecture and the extraction, transformation and loading of data may be very costly and time consuming. As such, the usefulness and/or timeliness of data warehouse applications may be reduced.

Similarly, in analyzing data from existing data warehouses, if such analysis is to be made available to different users, it may be incorporated into the data warehouse. Such analysis is, typically, incorporated into the data warehouse by information technology specialists as the programming language of data warehouses may be complex and/or unfamiliar to the typical end user of a data warehouse. As such, a user of a data warehouse may extract data from a data warehouse and incorporate the data in a spreadsheet which may provide a more familiar format for the analysis of data. The data may then be analyzed using the spreadsheet and the spreadsheet provided to the information technology specialist so that the analysis exemplified by the spreadsheet can be incorporated into the data warehouse. Thus, the availability of the analysis to other users of the data warehouse may be delayed as a result.

SUMMARY OF THE INVENTION

Embodiments of the present invention provide methods, systems, and computer program products for generating computations included in analytics of a multi-dimensional cube by analyzing a spreadsheet corresponding to data downloaded from the multi-dimensional cube so as to automatically convert a formula utilizing the downloaded data contained in the spreadsheet into a language of the multi-dimensional cube so as to provide a converted formula. The converted formula is incorporated into the multi-dimensional cube as a computed member.

In particular embodiments of the present invention, the spreadsheet is analyzed by identifying dimensions of the multi-dimensional cube corresponding to the data downloaded from the multi-dimensional cube, identifying members of the dimensions utilized in the formula in the spreadsheet and transforming the formula into a multi-dimensional cube formula based on the identified members. Data to be populated in the multi-dimensional cube is generated based on the transformed formula and the converted formula may be incorporated into the multi-dimensional cube by rebuilding the multi-dimensional cube utilizing the generated data to incorporate the converted formula into the multi-dimensional cube.

In additional embodiments of the present invention, rebuilding the multi-dimensional cube utilizing the generated data incorporates the generated data in a meta-outline of the multi-dimensional cube.

In still other embodiments of the present invention, identifying dimensions of the multi-dimensional cube is provided by identifying a query that generated the data downloaded from the multi-dimensional cube and then parsing the query to retrieve row and/or column dimension names. An origin of the data downloaded from the multi-dimensional cube may also be identified.

In further embodiments of the present invention, identifying members of the dimensions utilized in the formula in the spreadsheet is provided by identifying variables of the formula in the spreadsheet, determining whether the variables are changing in a column direction or a row direction and transforming spreadsheet locations of the variables to cell coordinates. Tables of dimension member names associated with variables of the formula provide a dimension table corresponding to each dimension associated with a variable in the formula. A list of cell coordinates of the dimension member names of the variables utilized in the formula is stored. Cell ranges of the spreadsheet are iterated over and, for each cell iterated, if a current cell being iterated is a data cell, a next cell is obtained. If the current cell being iterated is from a row header, for each entry in the list of cell coordinates of the dimension member names utilized in the formula, if the current cell has cell coordinates corresponding to the entry in the list of cell coordinates, the current cell contents are retrieved and added to the corresponding dimension table. If the current cell being iterated is from a column header, for each entry in the list of cell coordinates of the dimension member names utilized in the formula, if the current cell has cell coordinates corresponding to the entry in the list of cell coordinates, the current cell contents are retrieved and added to the corresponding dimension table.

In still other embodiments of the present invention, transforming the formula is provided by transforming the identified members of dimensions utilized in the formula in the spreadsheet into an on-line analytical processing (OLAP) command so as to selectively compress members of the dimensions to a hierarchical function based on hierarchies of the dimensions of the multi-dimensional cube. The formula is also transformed into an OLAP command format based on the transformation of the identified members.

In additional embodiments of the present invention, generating data to be populated in the multi-dimensional cube based on the transformed formula is provided by querying the multi-dimensional cube to determine a format of data to be populated into measure dimension tables of the multi-dimensional cube. Data to be populated in the multi-dimensional cube is generated based on the query of the multi-dimensional cube and the transformed formula in the OLAP command format.

In other embodiments of the present invention, transforming the identified members of dimensions utilized in the formula in the spreadsheet into an OLAP command so as to selectively compress members of the dimensions to a hierarchical function based on hierarchies of the dimensions of the multi-dimensional cube is provided by determining if a number of members of a dimension utilized in the formula exceeds a threshold and compressing members of the dimension to a hierarchical function based on a hierarchy of the dimension of the multi-dimensional cube if the number of members exceeds the threshold.

Furthermore, compressing members of the dimension to a hierarchical function based on a hierarchy of the dimension of the multi-dimensional cube if the number of members exceeds the threshold may include retrieving from the multi-dimensional cube, dimension hierarchy information, building lists of sets ordered by generation level based on the retrieved dimension hierarchy information, determining intersections between a set of the lists of sets and a set corresponding to members of a dimension utilized in the formula and compressing a set of members to a hierarchical function corresponding to a generation level corresponding to the set of the lists of sets if a determined intersection between a set of the lists of sets and the set corresponding to members of a dimension utilized in the formula is an exact match.

Additionally, compressing members of dimensions to a hierarchical function based on a hierarchy of dimensions of the multi-dimensional cube if the number of members exceeds the threshold may include heuristically determining if the members of the set corresponding to members of a dimension utilized in the formula correspond to a first member of the set of corresponding to members of a dimension utilized in the formula and all descendants of a generation level of the first member, all descendants of a generation level of the first member, all siblings at generation level including the first member, the first member and ancestors of the first member, all children of a generation level including the first member, the first member and all children of a generation level including the first member, the first member and ancestors of the first member and the first member and all descendants of the first member. The members of the set corresponding to members of a dimension utilized in the formula may be compressed to a hierarchical function based on the heuristic determination of a generational relationship between the members of the set corresponding to members of a dimension utilized in the formula and the hierarchy of the dimension.

As will further be appreciated by those of skill in the art, while described above primarily with reference to method aspects, the present invention may be embodied as methods, apparatus/systems and/or computer program products.

BRIEF DESCRIPTION OF THE DRAWINGS

FIG. 4 is an example spreadsheet for illustrating operations according to embodiments of the present invention;

DETAILED DESCRIPTION OF THE INVENTION

Figure 1:
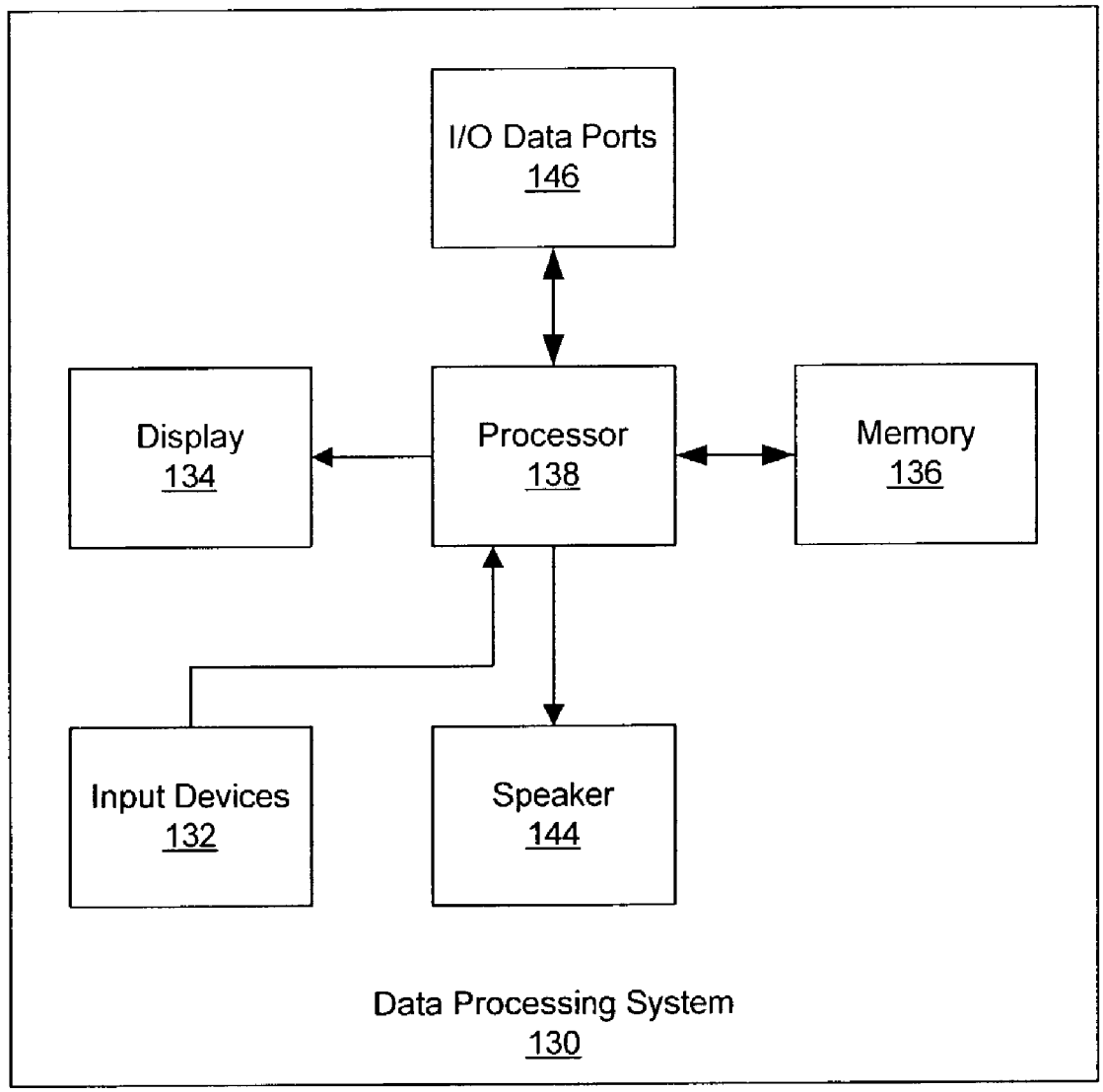
FIG. 1 is a block diagram of a data processing system suitable for use in embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. FIG. 1 illustrates an exemplary embodiment of a data processing system 130 suitable for use in accordance with embodiments of the present invention. The data processing system 130 typically includes input device(s) 132 such as a keyboard or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 2:
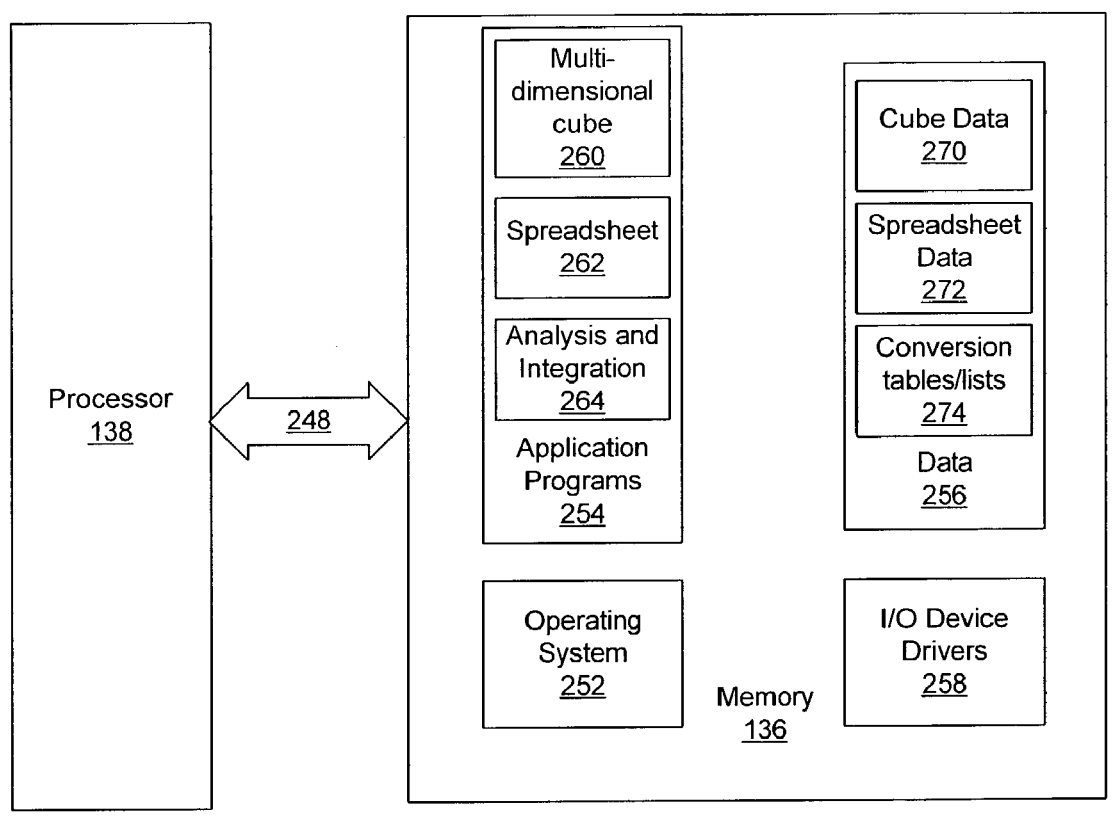
FIG. 2 is a more detailed block diagram of a system according to embodiments of the present invention.

FIG. 2 is a block diagram of data processing systems that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices containing the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the data processing system 130: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 130 and preferably include at least one application which supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 2, the application programs 254 may include a multi-dimensional cube application 260, a spreadsheet application 262 and an analysis and integration module 264. The multi-dimensional cube application 260 may be a conventional multi-dimensional cube application and, in certain embodiments, may be an on-line analytical processing (OLAP) compatible application. For example, the multi-dimensional cube application 260 may be a data warehouse, such as provided by a conventional OLAP engine. In particular embodiments of the present invention, the multi-dimensional cube application 260 is an OLAP engine that utilizes the Essbase Report Writer as an OLAP command interface. The spreadsheet application 262 may be any suitable spreadsheet application, such as Lotus 123, Microsoft Excel or the like. In particular embodiments of the present invention, the spreadsheet application 262 is a spreadsheet application that supports the OLAP standards. The analysis and integration module 264 may carry out the operations described herein for updating the multi-dimensional cube based on information contained in a spreadsheet.

The data portion 256 of memory 136, as shown in the embodiments of FIG. 2, may include multi-dimensional cube data 270, spreadsheet data 272 and/or conversion tables and/or lists 274. The multi-dimensional cube data 270 may provide the data utilized and/or stored by the multi-dimensional cube application 260. The spreadsheet data 272 may provide the data utilized by the spreadsheet application 262 and may include data retrieved from the multi-dimensional cube application 260. The conversion tables and/or lists 274 may include data utilized by the analysis and integration module 264.

While the present invention is illustrated, for example, with reference to the analysis and integration module 264 being an application program in FIG. 2, as will be appreciated by those of skill in the art, other configurations may also be utilized while still benefitting from the teachings of the present invention. For example, the analysis and integration module 260 may also be incorporated into the operating system 252 or other such logical division of the data processing system 130. Thus, the present invention should not be construed as limited to the configuration of FIG. 2 but is intended to encompass any configuration capable of carrying out the operations described herein.

Furthermore, while each of the multi-dimensional cube application 260, the spreadsheet application 262 and the analysis and integration module 264 are illustrated in a single data processing system, as will be appreciated by those of skill in the art, such functionality may be distributed across one or more data processing systems. For example, the functionality of the multi-dimensional cube application 260 may be provided on one or more data processing systems that are separate from the data processing system that provides the functionality of the spreadsheet application 262. Thus, the present invention should not be construed as limited to the configuration illustrated in FIGS. 1 and 2 but may be provided by other arrangements and/or division of function between data processing systems.

Figure 3:
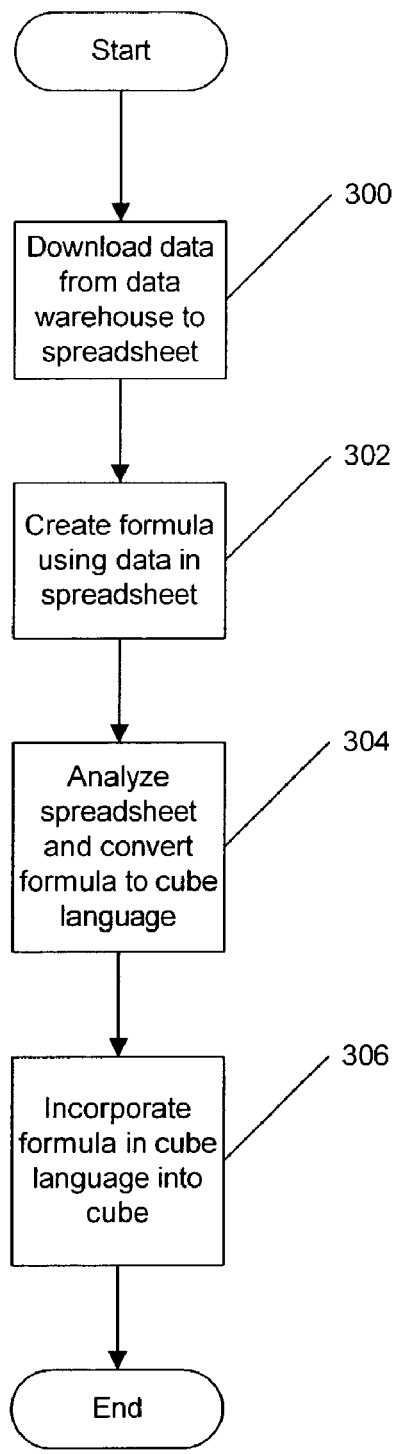
FIG. 3 is a flowchart illustrating operations for spreadsheet conversion and write-back according to embodiments of the present invention.

FIGS. 3 illustrates operations for analysis of data from a multi-dimensional cube and write-back of that analysis to the multi-dimensional cube for subsequent user access. As seen in FIG. 3, data from the multi-dimensional cube, such as the multi-dimensional cube application 260, is downloaded to a spreadsheet application, such as the spreadsheet application 262 (block 300). Such a download may be accomplished, for example, through an application program interface (API) of the multi-dimensional cube application 260. The downloaded data may then be analyzed in the spreadsheet environment and a formula utilizing the data created in the spreadsheet (block 302). The formula utilizing the downloaded data may, therefore, be created utilizing an abstraction of the data provided by the spreadsheet rather than the level of abstraction provided by the multi-dimensional cube, such as that provided by an OLAP engine. Such a spreadsheet abstraction of the data may be more familiar to analysts and, therefore, may make the development of measures of the data from the multi-dimensional cube more accessible.

After analysis and development of a formula utilizing the data in a spreadsheet format, the spreadsheet containing the formula is automatically analyzed, for example, by the analysis and integration module 264, and the formula(s) defining the measure are converted from a spreadsheet language to a language of the multi-dimensional cube for integration in the multi-dimensional cube (block 304). For example, in certain embodiments of the present invention, the spreadsheet formulas are converted into OLAP commands, such as Essbase Report Writer format. The converted formulas are then incorporated into the hypercube so as to incorporate the converted formulas into the multi-dimensional cube and, thereby, incorporate a computed member into the multi-dimensional cube (block 306). In particular, the formula may be written to a meta-outline of the multi-dimensional cube as computed members of a "measure" dimension that are automatically calculated during roll-up. Such an incorporation may be provided, for example, by automatically triggering a rebuild of the multi-dimensional hypercube so as to incorporate the converted formulas.

Administrative tools of OLAP products typically allow a meta-outline to be dynamically built, changed or removed by using a data source and a rules file. These conventional techniques for updating a meta-outline may be particularly applicable and suitable when the underlying multi-dimensional cube has changed, such as a product dimension is reorganized or a new product family is introduced. The conventional techniques typically rely heavily on the OLAP engine environment and may require extensive knowledge of OLAP. Embodiments of the present invention may, therefore, provide for automated mapping from a native spreadsheet format to a meta-outline format for incorporation in the multi-dimensional cube.

Thus, embodiments of the present invention may provide for OLAP cube definition outside of the OLAP engine. Embodiments of the present invention may also enable two-way communication between a spreadsheet application and an OLAP engine; i.e. the cube definition can be either specified in an OLAP engine or a spreadsheet application. Embodiments of the present invention may also simplify the procedure to specify the formulas that users, such as analysts, want to be rolled into a cube. The procedure of how the formulas get rolled into the cube is transparent to the users who, in turn, can spend more time calculating or analyzing data in depth.

Particular embodiments of the present invention will now be described with reference to FIG. 4, which is an exemplary spreadsheet of data downloaded from a multi-dimensional cube, FIGS. 5 through 9, which are flowcharts of operations according to particular embodiments of the present invention and FIG. 10 which is a block diagram of a generational hierarchy such as may be provided in a multi-dimensional hypercube. The operations of FIGS. 5 through 9 may be carried out, for example, by the analysis and conversion module 264 of FIG. 2.

Figure 4:
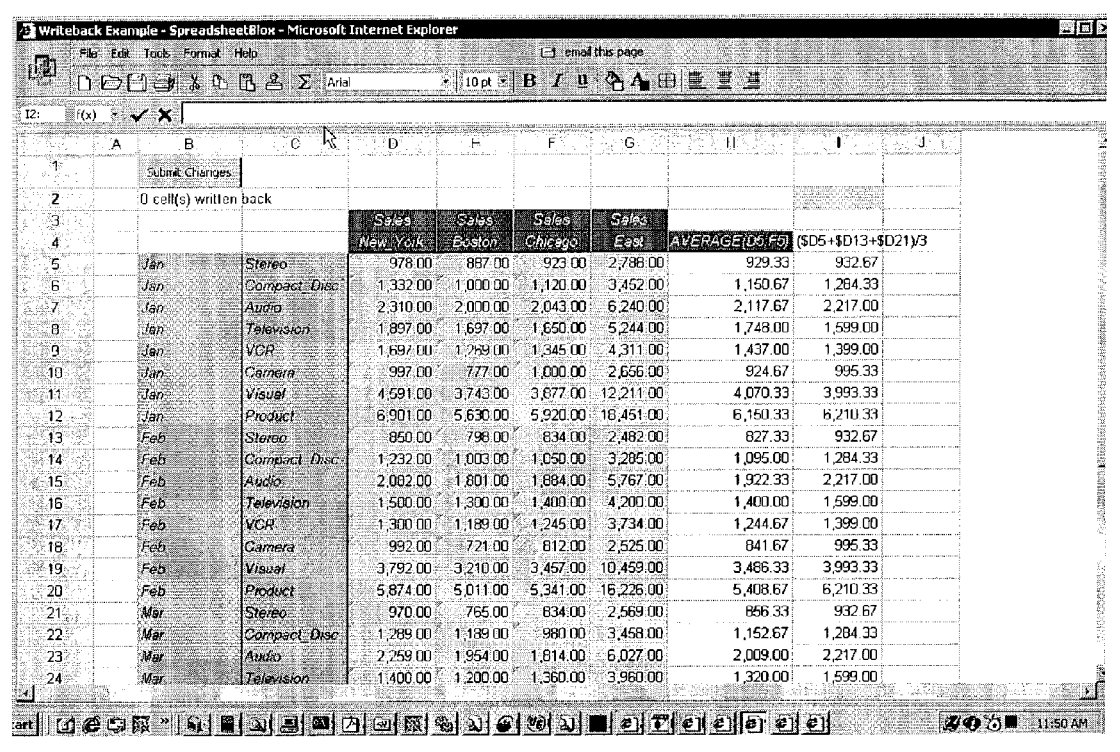
Figure 5:
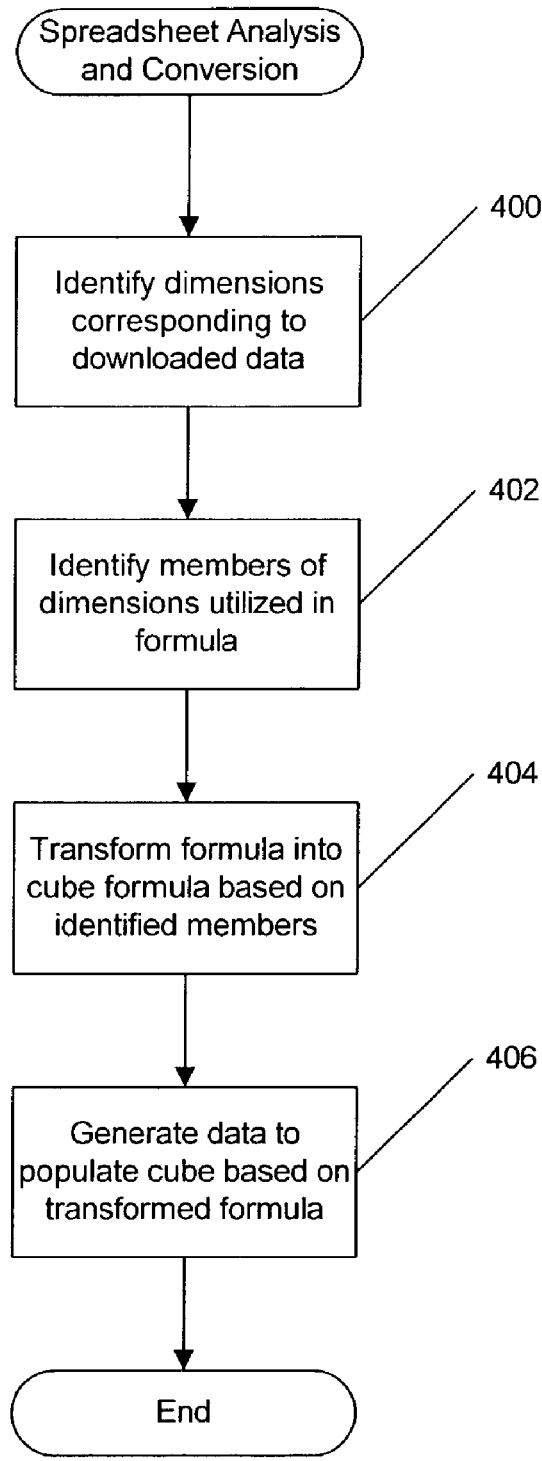
FIG. 5 is a flowchart illustrating operations for spreadsheet conversion and write-back according to further embodiments of the present invention.

In the example spreadsheet of FIG. 4, columns H and I are the new formulas that a user has created. The columns titles in H4 and 14 contain the formula that the spreadsheet uses to calculate the result. The operations illustrated in FIG. 5 illustrate operations for transforming from a spreadsheet to a multi-dimensional cube where the multi-dimensional cube has at least the dimensions as illustrated in FIG. 4. Data illustrated in FIG. 4 was downloaded from the hypercube of the data warehouse. By carrying out the operations illustrated in FIG. 5, the spreadsheet formula is converted into an OLAP command so that the computed member can be dynamically built and rolled up into the hypercube.

Turning to FIG. 5, the dimensions of the hypercube corresponding to the downloaded data are identified (block 400). Such an identification may, for example, be provided through an API of the multi-dimensional cube application 260 that identifies the dimensions of the query of the multi-dimensional cube that resulted in data being downloaded to the spreadsheet. For example, in the spreadsheet of FIG. 4, the row entries correspond to Year and Product dimensions such that different row entries correspond to different products and/or year values and column entries correspond to Accounts and Market dimensions such that entries in different columns correspond to different accounts and/or markets.

The identity of members of the dimensions of the hypercube utilized in the formula(s) is also identified (block 402), for example, through correlation of the spreadsheet cells of the formula to the members of the downloaded dimensions of the hypercube. In the example spreadsheet of FIG. 4, the formula in column H utilizes members New_York, Boston and Chicago of the Market dimension and the Sales member of the Accounts dimension. The formula in column I utilizes members Jan, Feb and March of the Year dimension and member Stereo of the Product dimension.

The formula of the spreadsheet is then transformed from the spreadsheet language to a cube language based on the identified members (block 404). Such a transformation may, for example, be provided by a look-up table of conversions of spreadsheet formulas to cube language formulas and the incorporation of the identified members into the cube language formulas. For example, the formula may be transformed from spreadsheet format into Essbase format. For example: the Spreadsheet formula of FIG. 4:

AVERAGE(D5:F5)

may be transformed to the Essbase format:

@AVG(SKIPNONE,Sales,"New_York,Boston,Chicago").

Data is then generated to populate the hypercube based on the transformed formula (block 406) and the hypercube may be rebuilt to incorporate the new computed member reflected in the spreadsheet formula. For example, the multi-dimensional cube may be queried to determine the format of the data to be populated into the measure dimension table(s) of the multi-dimensional cube by, for example, querying the format of the measure dimension table. For example, the multi-dimensional cube may be queried to determine the format of a "TBC.Measures" table of the multi-dimensional cube and the following data may be generated to insert into the TBC-.Measures table of a multi-dimensional cube:

values(1800,18,"AvgSales","Q1AVG_Sales","", "~", "T", "X", "", "", "", "", "@"

AVG(SKIPNONE,Sales,"New_York,Boston,Chicago"); ", "").

A batch file may then be run to automatically trigger a rebuild of the hypercube to incorporate the formula into the meta-outline of the multi-dimensional cube.

Figure 6:
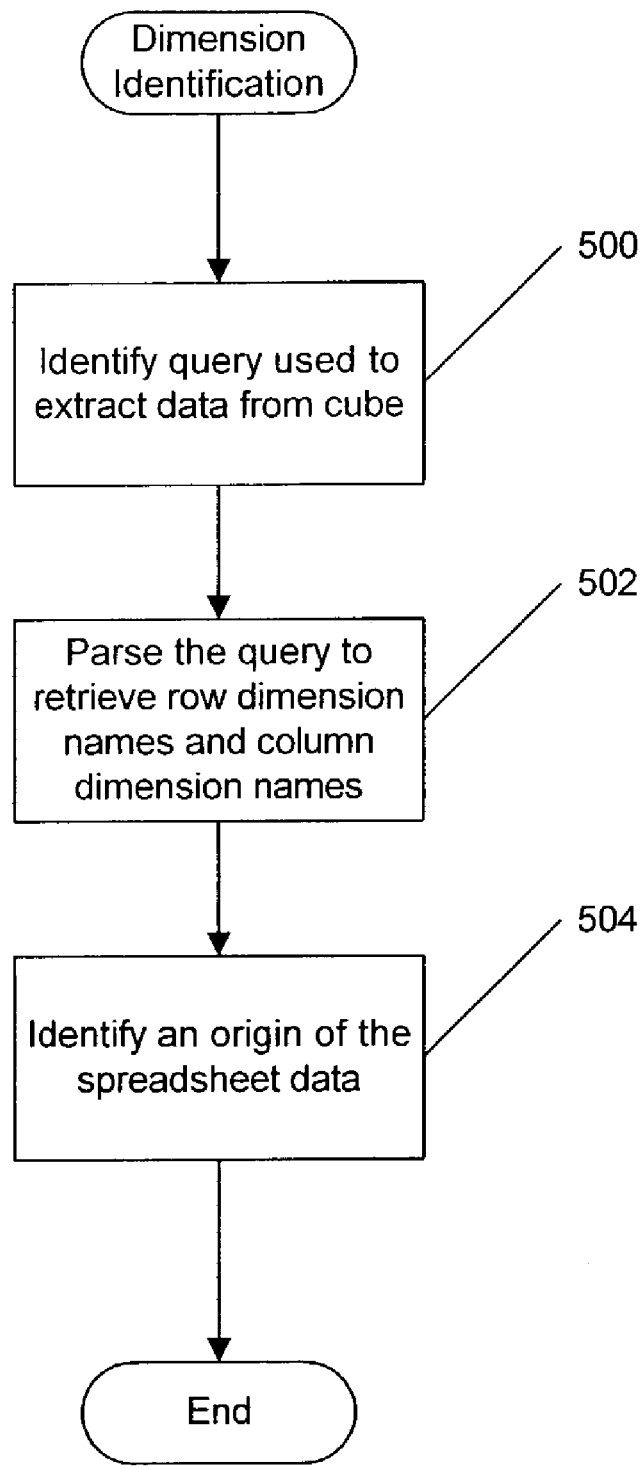
FIG. 6 is a flowchart illustrating operations for dimension identification according to embodiments of the present invention.

Operations of block 400 according to particular embodiments of the present invention are further illustrated in FIG. 6. As seen in FIG. 6, the query utilized to extract the data from the multi-dimensional cube is identified (block 500). For example, the query may be retrieved utilizing an OLAP API, such as the Alphablox API. Such a query may correspond to a slice of the hypercube. Thus, in the example illustrated in FIG. 4, the Datablox.getQuery( ) would return <row (Year, Product) Jan Feb Mar Qtr1 Qtr1 Stereo Compact_Disc Audio Television VCR Camera Visual Product <column (Accounts, Market) Sales Sales New_York Boston Chicago East!>. The query is then parsed to retrieve row dimension names and column dimension names (block 502). In the present example, Row names of Year and Product and Column names of Accounts and Markets would be identified. The spreadsheet origin may also be identified from the program (block 504). In the example spreadsheet, the origin is (B3) in spreadsheet notation, and (3,2) in Alphablox coordinates.

Figure 7:
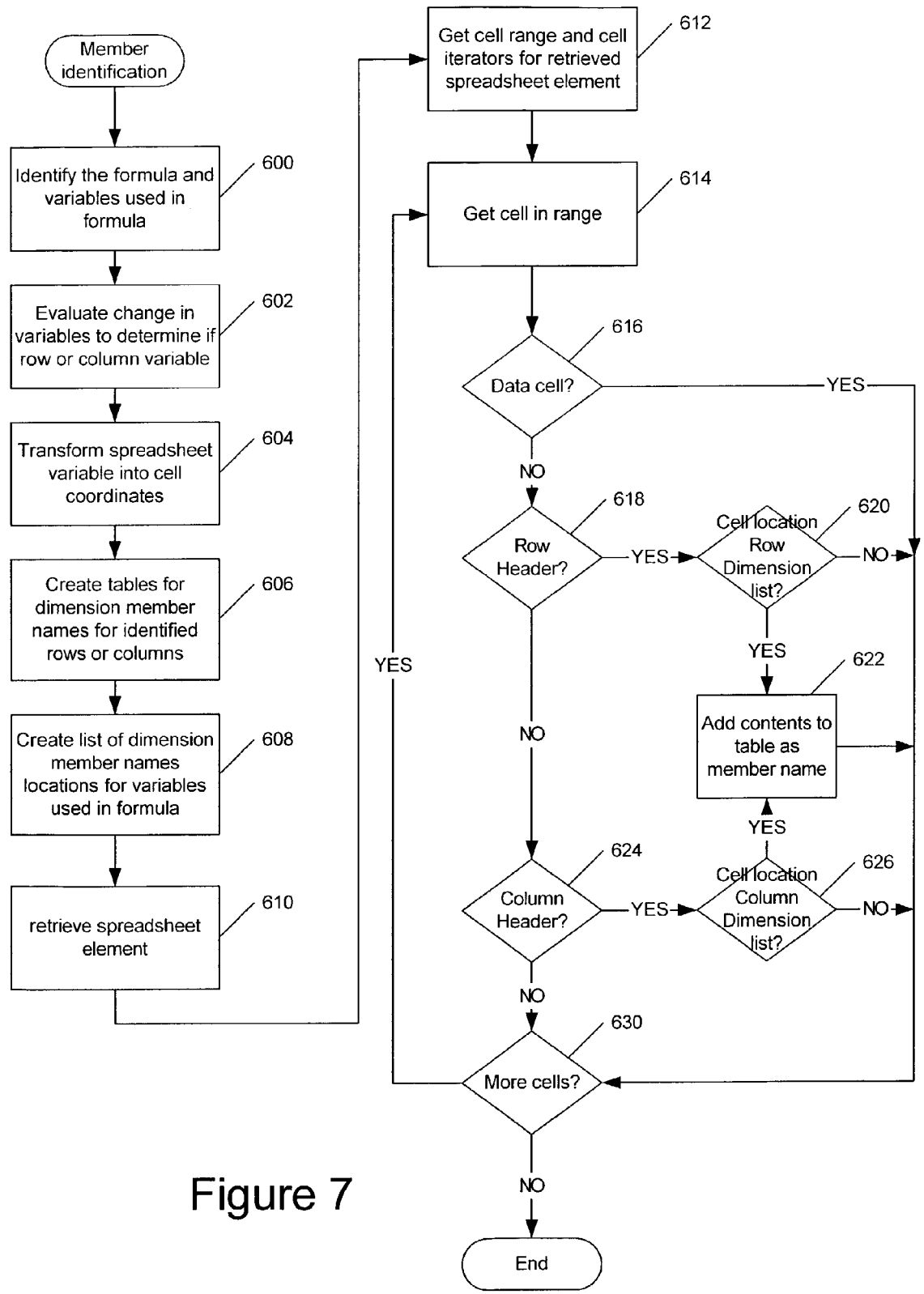
FIG. 7 is a flowchart illustrating operations for member identification according to embodiments of the present invention.

Operations of block 402 according to particular embodiments of the present invention are further illustrated in FIG. 7. As seen in FIG. 7, the formula of the spreadsheet is identified and variables used in the formula are identified (block 600). Such may be provided by extracting formulas from the spreadsheet and parsing the extracted formulas for cell identifications of the variables used in the formula. For example, in the equation AVERAGE(D5:F5) of FIG. 4, the variables are the cells D5 through F5.

The variables are analyzed to determine if changes in the variables are in the row or column direction (block 602). For example, if the column letter is changing from D to F as in the equation AVERAGE(D5:F5), the changes are in the column direction and, therefore, the variable comes from column axis on spreadsheet. The spreadsheet variable is then transformed into cell coordinates (block 604). For example, D4 of the spreadsheet would have cell coordinates (4,4) for spreadsheet blox cell coordinates. Based on the dimensions obtained in FIG. 6, tables are created to store sets of dimension member names associated with the variables that are used in the formulas (e.g. the row names and/or column names of the cells from the equation)(block 606). These tables are subsequently populated with dimension member names as discussed below. Lists are also provided of the dimension name locations of the dimension names associated with the variables of the formula (block 608). In the present example, for the formula AVG(D5:F5), the following lists of spreadsheet cell locations for dimension member names would be created:

| Markets dimension list |
|---|
| 4, 4 |
| 4, 5 |
| 4, 6 |
| Accounts dimension list |
| 3, 4 |
| 3, 5 |
| 3, 6 |

For the formula AVG((D5+D13+D21)/3) from cell I4 of FIG. 4, the following lists of spreadsheet cell locations for dimension member names would be created:

| Product dimension List |
|---|
| 5, 3 |
| 13, 3 |
| 21, 3 |
| Year dimension List |
| 5, 2 |
| 13, 2 |
| 21, 2 |

The spreadsheet element including, for example, the contents of the spreadsheet, is then retrieved (block 610), for example from xmlDoc. The spreadsheet element analyzed to get the cell Range and the cell Iterators (block 612). Cells in the spreadsheet element are then analyzed to determine the dimension member names. Thus, a cell in the range of cells of the spreadsheet is obtained (block 614) and it is determined if the cell contains data (block 616). If the current cell is a data cell, then no further processing of the cell is performed and it is determined if more cells remain in the spreadsheet element (block 630). If more cells remain, the next cell is obtained (block 614) and operations for that new current cell continue.

If the current cell is not a data cell (block 616), it is determined if the current cell is a row header (block 618). If the current cell is a row header (block 618), the lists of row member name locations is examined to determine if the current cell location corresponds to a cell location on one of the lists (block 620). If the cell location corresponds to a location on one of the lists (block 620), the contents of the cell are added to the table corresponding to the dimension associated with the list as a member name (block 622). If the cell location does not correspond to a location on one of the lists (block 620), the contents of the cell are not added to a table. In either case, operations then continue from block 630 with a determination of whether there are more cells to evaluate.

If the current cell is not a data cell (block 616) and is not a row header (block 618), it is determined if the current cell is a column header (block 624). If the current cell is a column header (block 624), the lists of column member name locations are examined to determine if the current cell location corresponds to a cell location on one of the lists (block 626). If the cell location corresponds to a location on one of the lists (block 626), the contents of the cell are added to the table corresponding to the dimension associated with the list as a member name (block 622). If the cell location does not correspond to a location on one of the lists (block 626), the contents of the cell are not added to a table. In either case, operations then continue from block 630 with a determination of whether there are more cells to evaluate.

Thus, as a result of carrying out the operations of FIG. 7, the dimension tables illustrated below would result. Two dimension tables are created when the formula uses members from columns of the spreadsheet:

---

Market dimension:

New York
Boston
Chicago
Account Dimension

Sales

---

Two dimension tables are created when the formula uses members from rows of the spreadsheet:

---

Year Dimension.

Jan
Feb
March
Product Dimension

Stereo

---

Sample code for carrying out the operations of blocks 610 through 630 of FIG. 7 is illustrate below.

```
SpreadsheetElement spreadsheet = null;
SpreadsheetCell currentCell = null;
spreadsheet = xmlDoc.getSpreadsheetElement( );
HeaderElement header = xmlDoc.getHeader( );
/// iterate over the cells, inspecting the dimension member we want to
collect and retrieve
CellRange cellRange = spreadsheet.getCellRange( );
CellIterator cellIterator = cellRange.cellIterator( );
while (cellIterator.hasNext( ))
    {
    currentCell = cellIterator.findNextCell( );
    // skip blank cells
    if (currentCell == null)
        continue;
    // figure out if the cell is a resultset data cell, a resultset row head,
    // a resultset column head, or none of the above...
    int resultSetInfo = currentCell.getResultSetInfo( );
    // based on cell "type", set update the style
    if (resultSetInfo == SpreadsheetCell.RS_DATA)
        {
        // data cell, do nothing
        }
    else if (resultSetInfo == SpreadsheetCell.RS_HEADER_ROW)
        {
        // row header
        for each element in the RowHashtable
        if(currentCell.getResultSetCoords( )=listMember)
            {
            RowHashTable.add(currentCell.getValue( ));
            }
        }
    else if (resultSetInfo == SpreadsheetCell.RS_HEADER_COL)
        {
        // column header
        for each element in the ColumnHashtable
        if(currentCell.getResultSetCoords( )=listMember)
            {
            RowHashTable.add(currentCell.getValue( ));
            }
        }
    }
```

Figure 8:
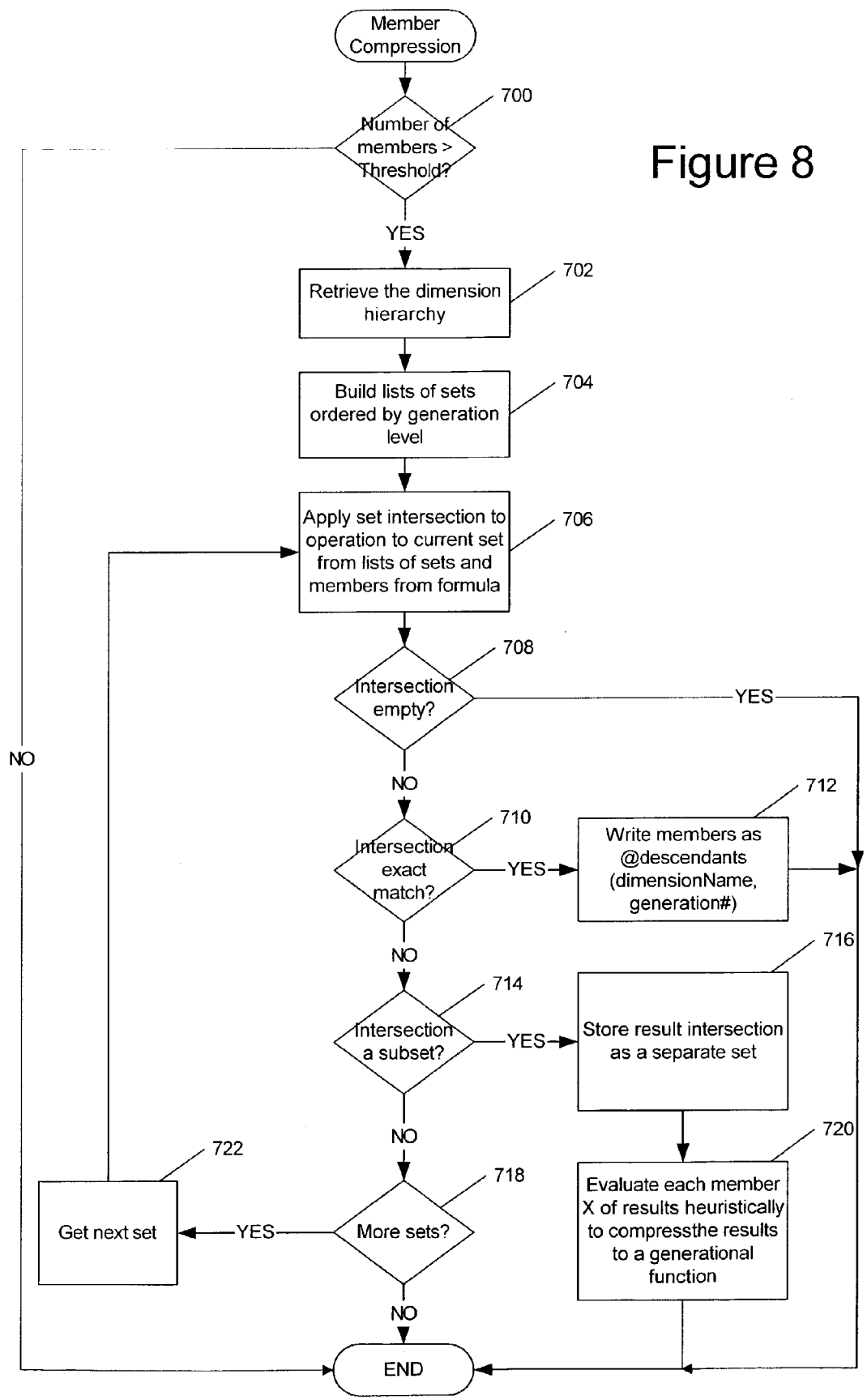
FIG. 8 is a flowchart illustrating operations for member compression according to embodiments of the present invention.
Figure 9:
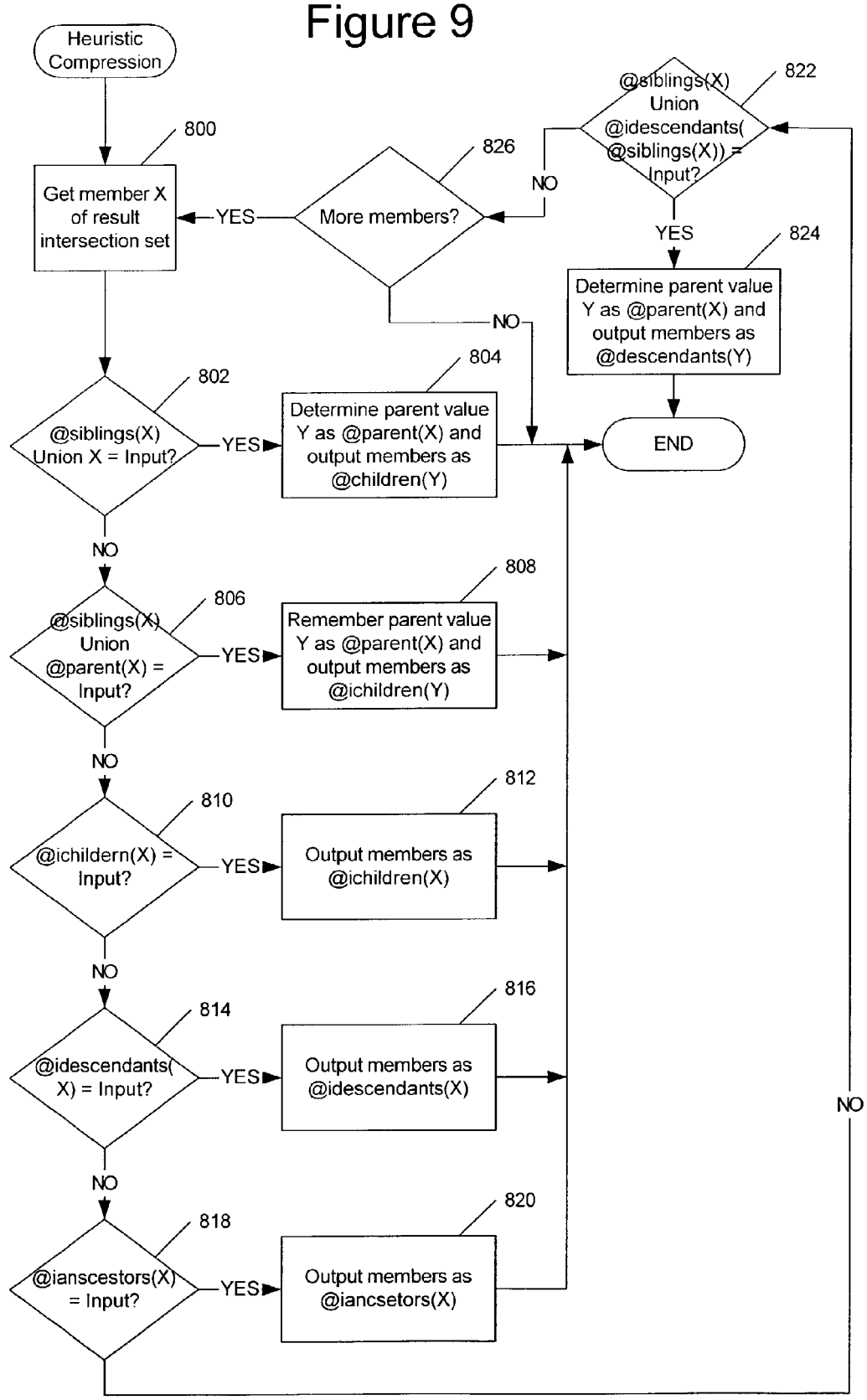
FIG. 9 is a flowchart illustrating operations for member compression according to further embodiments of the present invention.

Operations of block 404 according to particular embodiments of the present invention are further illustrated in FIGS. 8 and 9. In particular, the operations of FIGS. 8 and/or 9 may be utilized to compress the members of a dimension so as to reduce the number of members incorporated in a formula to be written back to the hypercube. As illustrated in FIG. 8, if the number of members identified is less than a threshold value (block 700), then no compression of the number of members is necessary and transformation of the formula and the members into a cube language may be carried out as described above with reference to FIG. 5. Thus, for example, the formula may be written as an Essbase report writer command of AVERAGE(SKIPNONE, Sales, "New_York,Boston,Chicago").

If, however, the number of members exceeds the threshold value (block 700), the dimension hierarchy is retrieved from the multi-dimensional cube (block 702). The retrieval of the hierarchy may be performed utilizing, for example, the Essbase API or Alphablox API. Lists of generation ordered sets are built (block 704) based on the retrieved dimension hierarchy. An intersection operation is applied to the input set of members and one of the ordered lists (block 706). If the intersection is an empty set (block 708), it is determined if additional ordered lists are present (block 718). If not, operations terminate. If additional lists are present (block 718), the next list is obtained (block 722) and operations continue with the intersection operation utilizing the new ordered list (block 700).

If the intersection is not an empty set (block 708), it is determined if an exact match exists (block 710). If an exact match exists (block 710), the members are written as descendants of the generation corresponding to the current list (block 712) and operations for compression end. For example, the members could be written as the Essbase function @descendants(dimensionName, generation#).

If an exact match does not exist (block 710), it is determined if the intersection is a subset of the current list (block 714). If the intersection is not a subset of the current list (block 714), operations continue at block 718. If the intersection is a subset of the current list (block 714), the result intersection is stored as a separate set (block 716). Each member (X) of the result intersection is then heuristically evaluated to compress the results to a generational function (block 720) and operations for compression end when a suitable generational function is found.

Examples of generation functions include Essbase functions, such as the following:

The @IDESCENDANTS function returns the specified member and either (1) all descendants of the specified member or (2) all descendants down to a specified generation or level;

The @DESCENDANTS function returns all descendants of the specified member, or those down to the specified generation or level. This function excludes the specified member;

The @SIBLINGS( ) function returns all siblings of the specified member. This function excludes the specified member;

The @ANCESTORS( ) function returns all ancestors of the specified member (mbrName) or those up to a specified generation or level;

The @IANCESTORS( ) function returns the specified member and either (1) all ancestors of the specified member or (2) all ancestors up to the specified generation or level;

The @CHILDREN( ) function returns all children of the specified member, excluding the specified member;

The @ICHILDREN( ) function returns the specified member and all of its children; and The @PARENT( ) function returns the parent of the current member being calculated in the specified dimension.

FIG. 9 illustrates operations for heuristically determining if an intersection may be compressed to one of the Essbase generational functions described above and may provide the operations illustrated in block 720 of FIG. 8. As seen in FIG. 9, a member X of the intersection set is obtained (block 800). The union of X and @siblings(X) is compared to the input set (block 802). If they are equal (block 802), the parent value (Y) of X is determined as @parent(X) and the members are output as @children(Y) (block 804). If they are not equal (block 802), the union of @siblings(X) and @parent(X) is compared to the input set (block 806). If they are equal (block 806), Y, the parent of X, is used to output the members as @ichildren (Y) (block 808). If they are not equal (block 806), the value of @ichildren(X) is compared to the input set (block 810). If they are equal (block 810), the members are output as @ichildren(X) (block 812). If they are not equal (block 810), the value of @idescendants(X) is compared to the input set (block 814). If they are equal (block 814), the members are output as @idescendants(X) (block 816). If they are not equal (block 814), the value of @iancestors(X) is compared to the input set (block 818). If they are equal (block 818), the members are output as @iancestors(X) (block 820). If they are not equal (block 818), the union of @siblings(X) and @idescendants(@siblings(X)) is compared to the input set (block 822). If they are equal (block 822), the value (Y) of @parent(X) is determined and the members are output as @descendants(Y) (block 824). If they are not equal (block 822), it is determined if more members (X) are in the result intersection set (block 826). If not, operations end. If more members are present (block 826), the next member is obtained and operations continue from block 800.

Figure 10:
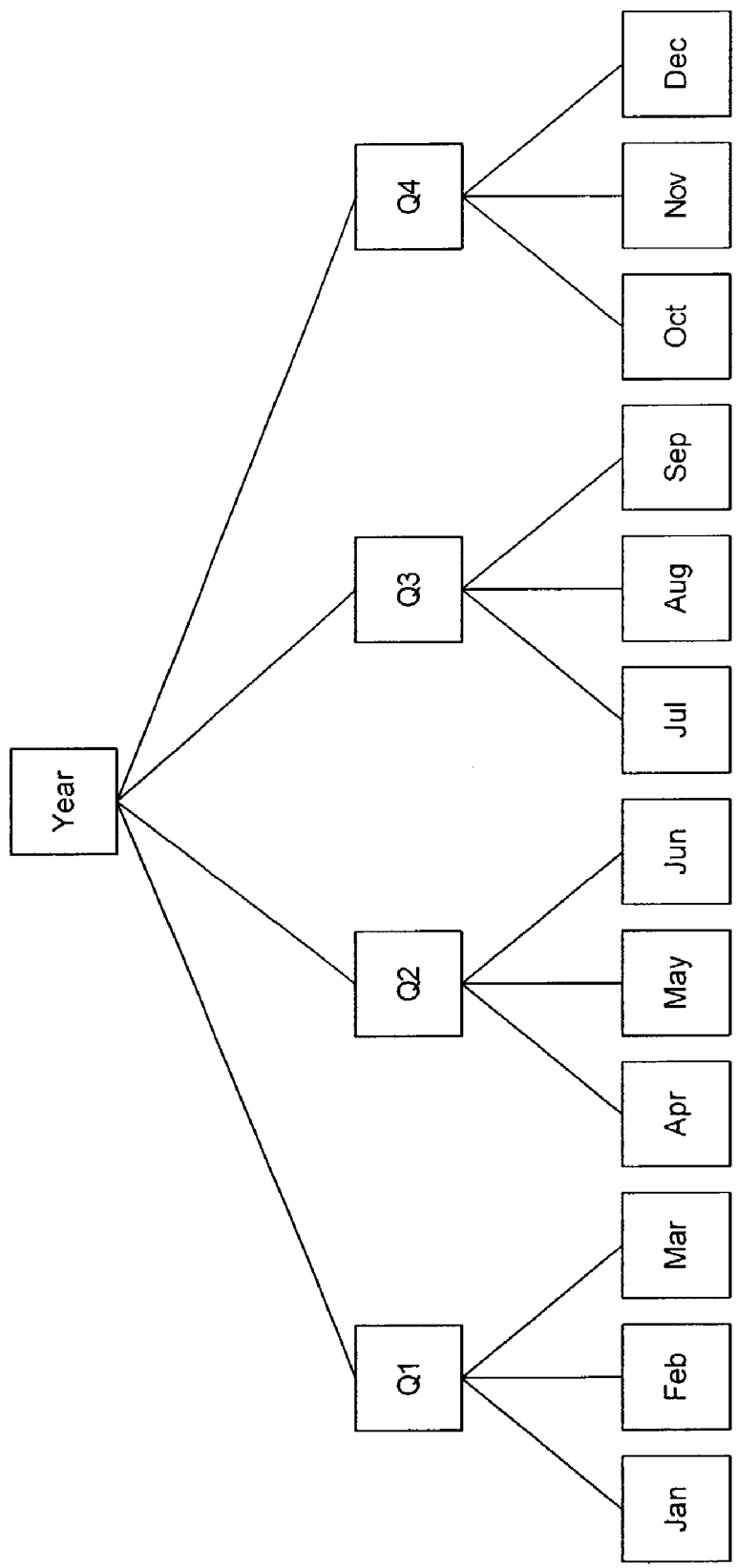
FIG. 10 is a block diagram of a generational hierarchy.

FIG. 10 illustrates a generational hierarchy for a "time" dimension and operations of FIGS. 8 and 9 will be described with reference to the exemplary generational hierarchy of FIG. 10. In the present example, the input set is {Jan, Feb, Mar, Q1}. As seen in FIG. 10, the "time" dimension includes three generations of members of a hierarchy, year, quarter and month. In block 704 of FIG. 8, the following lists are generated:

Generation 1: Year
Generation 2: Q1, Q2, Q3, Q4
Generation 3: Jan, Feb, Mar, Apr, May, Jun, Jul, Aug, Sep, Oct, Nov, Dec The intersection of {Jan, Feb, Mar, Q1} with the generation 1 set is the empty set but the intersection with the generation 2 set is {Q1}. The union of the siblings of the intersection element (Q1) and the intersection element is the set of {Q1, Q2, Q3, Q4} so there is no match with the input set {Jan, Feb, Mar, Q1}. The union of the siblings and the parent of X also does not match the input set. However, the ichildren set matches the input set of {Jan, Feb, Mar, Q1} and so the output of the members is @ichildren(Q1).

As a further examples, if the result set is {Jan, Feb, Mar}, the output will be @siblings(Jan). If the result set is {Jan, Feb, . . . , Dec, Q1, Q2, Q3, Q4} the output will be @descendants(Year). If the result set is {Jan, Q1, Year} the output will be @iancestors(Jan).

While embodiments of the present invention have been described herein with reference to determining if a variable of the formula is changing based on the contents of the formula, as will be appreciated by those of skill in the art in light of the present disclosure, further analysis of the spreadsheet may also be carried out to determine if multiple formulas are sufficiently similar, for example, in a column or row direction, to determine if additional variables are changing. In such a manner the formulas may be characterized in row and/or column directions so as to further define members utilized in a group of formulas. Such an analysis may be carried out in addition to or in lieu of analysis of variables changing within a specific formula as described above.

The flowcharts and block diagrams of FIGS. 1 through 10 illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of implementing spreadsheet conversion and write-back to a multi-dimensional cube, comprising:
   executing a query to identify data within the multi-dimensional cube;
   downloading data from the multi-dimensional cube to a spreadsheet of a spreadsheet application that is executing on a data processing system by extracting the queried data from the multi-dimensional cube;
   identifying dimensions corresponding to the data downloaded from the multi-dimensional cube into the spreadsheet based upon identifying at least one of the query that generated the data extracted from the multi-dimensional cube and then parsing the query to retrieve row and/or column dimension names or by identifying an origin of the data extracted from the multi-dimensional cube and identifying dimension names based upon the identified origin;
   identifying at least one formula that was created in the spreadsheet that utilizes data downloaded from the multi-dimensional cube, where each identified formula utilizes the data in a native spreadsheet format according to a spreadsheet language, which is different from a cube language of the multi-dimensional cube;
   identifying members of the dimensions corresponding to data extracted from the multi-dimensional cube that are utilized in each identified formula created in the spreadsheet through correlation of the spreadsheet cells of the formula to the members of the identified dimensions corresponding to the downloaded data;
   automatically transforming each identified formula created in the spreadsheet from the spreadsheet language of the spreadsheet application into the cube language of the multi-dimensional cube based on the identified members corresponding to data extracted from the multi-dimensional cube so as to provide a transformed formula based on the identification of the dimensions and members corresponding to the queried data by:
utilizing a lookup table of conversions to automatically look up and convert the spreadsheet formulas to cube language formulas; and
incorporating the identified members of the formula into the cube language formula; and
triggering a rebuild of the multi-dimensional cube so as to incorporate each transformed formula into the multi-dimensional cube as a computed member; and
generating data to populate the multi-dimensional cube based upon each transformed formula.

2. The method of claim 1, wherein:
the automatically transforming each identified formula added to the spreadsheet having identified members corresponding to data extracted from the multi-dimensional cube into a language of the multi-dimensional cube comprises:
transforming each formula into a multi-dimensional cube formula based on its identified members; and
the triggering a rebuild of the multi-dimensional cube so as to incorporate each transformed formula into the multi-dimensional cube as a computed member comprises:
rebuilding the multi-dimensional cube utilizing the generated data to incorporate the transformed formula into the multi-dimensional cube.

3. The method of claim 2, wherein rebuilding the multi-dimensional cube utilizing the generated data comprises incorporating the generated data in a meta-outline of the multi-dimensional cube.

4. The method of claim 1, wherein the identifying dimensions corresponding to the queried data extracted from the multi-dimensional cube into the spreadsheet comprises:
identifying the query that generated the data extracted from the multi-dimensional cube; and
parsing the identified query to retrieve row and/or column dimension names.

5. The method of claim 1, wherein the identifying members of the dimensions corresponding to data extracted from the multi-dimensional cube that are utilized in the creation of each identified formula created in the spreadsheet comprises:
identifying variables of the formula in the spreadsheet;
determining whether the variables are changing in a column direction or a row direction;
transforming spreadsheet locations of the identified variables to cell coordinates;
storing tables of dimension member names associated with the identified variables of the formula to provide a dimension table corresponding to each dimension of the formula;
storing a list of cell coordinates of the dimension member names of the variables utilized in the formula;
iterating over cell ranges of the spreadsheet and, for each cell iterated:
if a current cell being iterated is a data cell obtain a next cell;
if the current cell being iterated is from a row header, for each entry in the list of cell coordinates of the dimension member names of the spreadsheet elements utilized in the formula, if the current cell has cell coordinates corresponding to an entry in the list of cell coordinates, retrieving the current cell contents and adding the contents to the corresponding dimension table to provide a member name entry; and
if the current cell being iterated is from a column header, for each entry in the list of cell coordinates of the dimension member names of the spreadsheet elements utilized in the formula, if the current cell has cell coordinates corresponding to an entry in the list of cell coordinates, retrieving the current cell contents and adding the contents to the corresponding dimension table to provide a member name entry.

6. The method of claim 1, wherein the automatically transforming each identified formula added to the spreadsheet having identified members corresponding to data extracted from the multi-dimensional cube into a language of the multi-dimensional comprises:
transforming the identified members of dimensions utilized in the formula into an on-line analytical processing (OLAP) command so as to selectively compress members of the dimensions to a hierarchical function based on hierarchies of the dimensions of the multi-dimensional cube; and
transforming the formula into an OLAP command format based on the transformation of the identified members.

7. The method of claim 6, wherein the generating data to populate the multi-dimensional cube based upon each transformed formula comprises:
querying the multi-dimensional cube to determine a format of data to be populated into measure dimension tables of the multi-dimensional cube; and
generating data to be populated in the multi-dimensional cube based on the query of the multi-dimensional cube and the transformed formula in the OLAP format.

8. The method of claim 6, wherein transforming the identified members of dimensions utilized in the formula into an on-line analytical processing (OLAP) command so as to selectively compress members of the dimensions to a hierarchical function based on hierarchies of the dimensions of the multi-dimensional cube comprises:
determining if a number of members of a dimension utilized in the formula exceeds a threshold; and
compressing members of the dimension to a hierarchical function based on a hierarchy of the dimension of the multi-dimensional cube if the number of members exceeds the threshold.

9. The method of claim 8, wherein compressing members of a dimension to a hierarchical function based on a hierarchy of the dimension of the multi-dimensional cube if the number of members exceeds the threshold comprises:
retrieving from the multi-dimensional cube, dimension hierarchy information;
building lists of sets ordered by generation level based on the retrieved dimension hierarchy information;
determining intersections between a set of the lists of sets and a set corresponding to members of a dimension utilized in the formula; and
compressing a set of members to a hierarchical function corresponding to a generation level corresponding to the set of the lists of sets if a determined intersection between a set of the lists of sets and the set corresponding to members of a dimension utilized in the formula is an exact match.

10. The method of claim 9, wherein compressing members of dimensions to a hierarchical function based on a hierarchy of dimensions of the multi-dimensional cube if the number of members exceeds the threshold further comprises:
heuristically determining if the members of the set corresponding to members of a dimension utilized in the formula correspond to a first member of the set of members corresponding to members of a dimension utilized in the formula and all descendants of a generation level of the first member, all descendants of a generation level of the first member, all siblings at generation level including the first member, the first member and ancestors of the first member, all children of a generation level including the first member, the first member and all children of a generation level including the first member, the first member and ancestors of the first member and the first member and all descendants of the first member; and compressing the members of the set corresponding to members of a dimension utilized in the formula to a hierarchical function based on the heuristic determination of a generational relationship between the members of the set corresponding to members of a dimension utilized in the formula and the hierarchy of the dimension.

* * * * *